July 20, 1965     D. A. DIETSCHE     3,195,839
BALLOON PAYLOAD LAUNCHING TECHNIQUE
Filed Sept. 27, 1962     3 Sheets-Sheet 1

INVENTOR.
DELMAR A. DIETSCHE
BY *William C. Babcock*
ATTORNEY

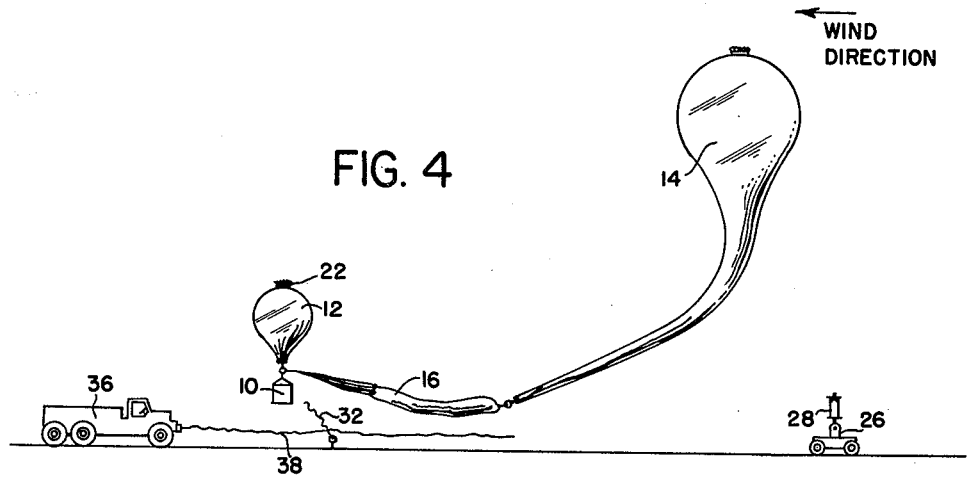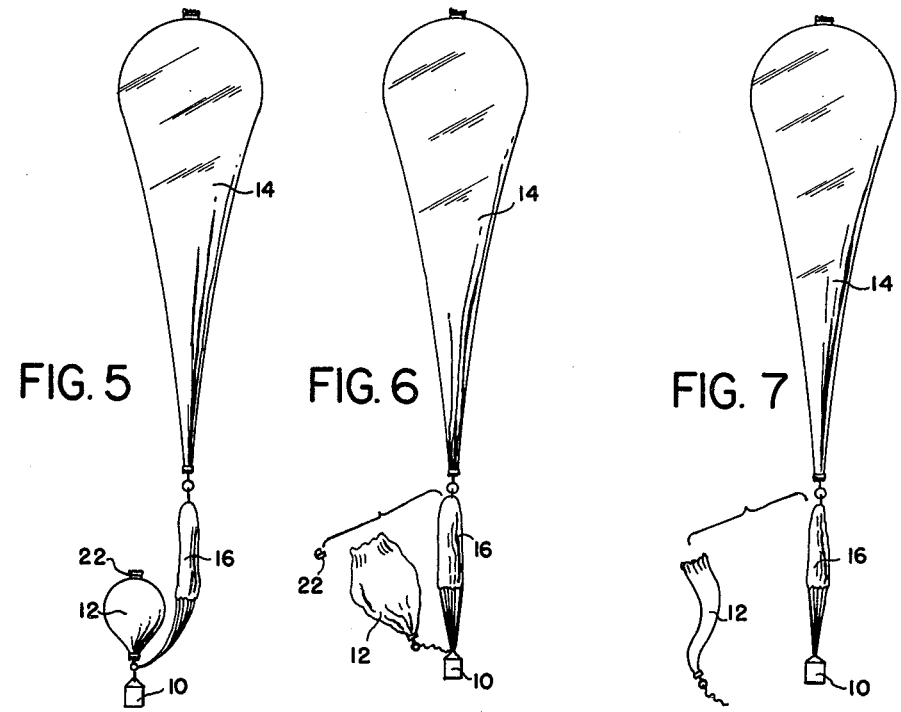

July 20, 1965  D. A. DIETSCHE  3,195,839
BALLOON PAYLOAD LAUNCHING TECHNIQUE
Filed Sept. 27, 1962  3 Sheets-Sheet 3

INVENTOR.
DELMAR A. DIETSCHE
BY
ATTORNEY

United States Patent Office 3,195,839
Patented July 20, 1965

3,195,839
BALLOON PAYLOAD LAUNCHING
TECHNIQUE
Delmar A. Dietsche, St. Paul, Minn., assignor, by mesne assignments, to Litton Systems, Inc., Beverly Hills, Calif., a corporation of Maryland
Filed Sept. 27, 1962, Ser. No. 226,628
20 Claims. (Cl. 244—98)

The present invention relates to a technique for launching a payload into the atmosphere, and more particularly to a method of and a system for launching a payload for atmospheric flight by the use of two separate balloons.

Gas inflatable balloons are ofttimes used for carrying a payload which includes meteorological instruments or the like, to a predetermined altitude and for a prescribed length of time. As the weight of the payload increases, and/or the maximum altitude to be attained increases, a larger balloon is required to accommodate the additional amount of lifting gas necessary for the heavier payload when this gas is fully expanded at the prescribed float altitude, or for the greater expansion required at a higher altitude. As is well known in the art, the balloon is initially inflated, although not completely filled, with a prescribed amount of lifting gas to carry the payload to its predetermined floating altitude. As the balloon ascends and the ambient atmospheric pressure decreases, the lifting gas within the balloon expands and the balloon ultimately becomes fully inflated. It has been found, that as the size of the balloon increases, problems encountered in the ground handling of the balloon increase, i.e. during inflation and launching, for many problems are encountered in bringing the balloon from its collapsed or deflated position on the launch surface to an airborne inflated position.

Various techniques have been used for launching a payload into the atmosphere by the use of a single balloon. One commonly used method of launching a balloon-borne payload is referred to as the vertical launch method, by which the balloon is inflated and maintained in a substantially vertical position during final stages prior to launch without the use of a launch vehicle or a launch platform. This method is not entirely satisfactory because it has been found that it is especially vulnerable to surface winds, and it requires excessive preparation time and equipment to properly execute.

Another method commonly used, especially for large balloons, utilizes a movable vehicle, such as a truck, for aiding in launching the payload. The payload is mounted or attached to either the rear or the front of the launch vehicle and as the balloon is inflated and as it begins its ascent, the vehicle carrying the payload moves in the same general direction as the direction of movement of the ascending balloon, thereby providing a movable platform for supporting the payload until the balloon lifts it into the atmosphere. Both upwind and downwind launches are accomplished with this method. This method also has several inherent disadvantages and deficiencies however. For example, it requires a special vehicle for carrying the payload prior to its ascent into the atmosphere; the launch must be performed on a runway, such as an airport runway, or other hard surfaced area to accommodate the moving vehicle; a relatively large number of launch personnel are required; a safety hazard exists concerning the launch personnel present during the launch procedure, for example, those riding in the launch vehicle; and it is likewise vulnerable to high surface winds.

Still another method frequently used is the so-called "hand launch" or "upwind dolly launch." This method requires the payload to be downwind relative to the balloon. The balloon is anchored to an anchor vehicle by connecting the bottom end fitting of the balloon, or the parachute if a parachute is included, to the vehicle; the upper end of the balloon is restrained by a launch platform, roller arm, or the like. The payload is either hand carried, or positioned on a movable dolly or platform so that it may be manually moved with respect to the balloon, in such a manner that as the balloon is released and as it reaches a vertical position, generally above the payload, the payload is lifted off from the dolly on out of the hands of the personnel holding it, and the anchor line is then released. Deficiencies of this method are that it is dangerous to any personnel in the immediate vicinity, especially the person holding the payload, and the payload might be damaged because it might bounce along the ground after it has been released by the person or lifted off the platform or dolly.

Accordingly, one object of the present invention is to provide an improved technique for launching a payload into the atmosphere.

Another object is to provide an improved method for launching a payload into the atmosphere by the use of two separate balloons.

Still another object is to provide a technique for launching a balloon-borne payload which requires a minimum number of personnel to launch the payload, and which reduces the dangers to launch personnel during the launch procedure.

A further object is to provide a balloon launch technique which eliminates the requirement of a launch vehicle and a suitable environment for accommodating the launch vehicle.

A still further object is to provide a technique for launching a balloon-borne payload which can be safely launched in relatively high surface winds.

Other objects and advantages of the invention will become apparent from a consideration of the following specification and accompanying drawings. Before proceeding with a detailed description of the invention, a brief description of it will be presented.

Preferably, the invention involves the use of at least two balloons for launching a payload; a first balloon or launch balloon, and a second balloon or main balloon which is substantially larger than the first balloon. The payload is attached directly to the first balloon by appropriate means, and indirectly to the second balloon by means of a flexible cable, parachute, or the like. The first balloon is inflated with sufficient lighter-than-air gas to lift the payload off the launch surface and into the atmosphere. The second balloon is inflated with a larger amount of lifting gas than the first balloon, to enable it to carry the payload to its predetermined altitude. The balloons are initially anchored to affixed anchor points, to permit their inflation and to prevent premature ascent of the payload; when they are released, the second balloon rises faster than the first balloon due to the excess amount of lifting gas, and it ultimately carries the payload to its desired altitude.

The invention will best be understood by reference to the following drawings, wherein:

FIGURE 4 illustrates the invention at a later stage, after the balloons have been released from their respective anchor points;

FIGURE 5 illustrates the invention at a still later stage, after the payload has been launched;

FIGURE 6 illustrates the invention after the first balloon has been deflated, and the payload is supported solely by the second balloon;

FIGURE 7 illustrates the system after the first balloon has been separated from the payload;

Figure 1:
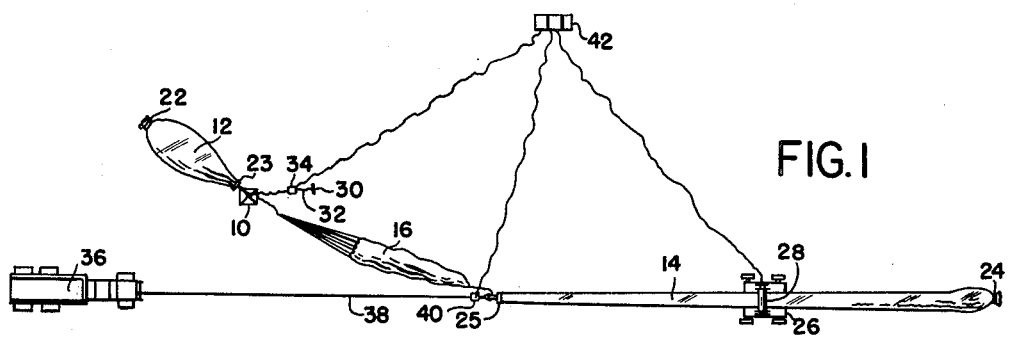
FIGURE 1 is a top plan view which illustrates the payload and two balloons after the balloons have been laid out adjacent to the payload, prior to inflation.

In FIGURE 1, the system for launching a payload into the atmosphere is illustrated in its initial stage prior to inflation of the balloons and prior to the ascent of the balloons. The payload 10 is shown attached directly to the appendix of a first balloon 12, also referred to as a launch balloon. The balloon 12 is shown in a deflated condition lying adjacent to the payload 10. The payload 10 is also attached to a parachute 16, which indirectly attaches the payload to a second balloon 14, also referred to as a main balloon. The second balloon is proximately positioned relative to the payload and separated therefrom by the parachute 16. Each of the balloons 12 and 14 are formed by joining together a plurality of gores, in a manner well known in the art. The balloons 12 and 14 are provided with end fittings 22 and 24 at their respective apices, and end fittings 23 and 25 at their respective appendices, for joining the ends of the gores together. The end fittings 22 and 24 are severable so that the balloons may be deflated and thereby returned to the ground when the balloon flight is completed. One type of balloon deflation apparatus which might be used is shown for example in the co-pending application of Wesley C. Borgeson and Thomas M. Olson, Serial No. 54,944, filed September 9, 1960, which is assigned to the assignee of the present invention.

The payload 10 is attached to the balloon 12 by a coupling 18, and the parachute 16 is attached to the balloon 14 by a coupling 20; these couplings permit the payload 10 and the parachute 16 to be separated from balloons 12 and 14 respectively if so desired. Couplings for releasably attaching a payload or parachute to a balloon are well known in the art and will not be described in detail. Couplings of this nature, which releasably attach a load to a balloon, might be actuated by a pressure switch, radio command signal, or the like.

Figure 2:
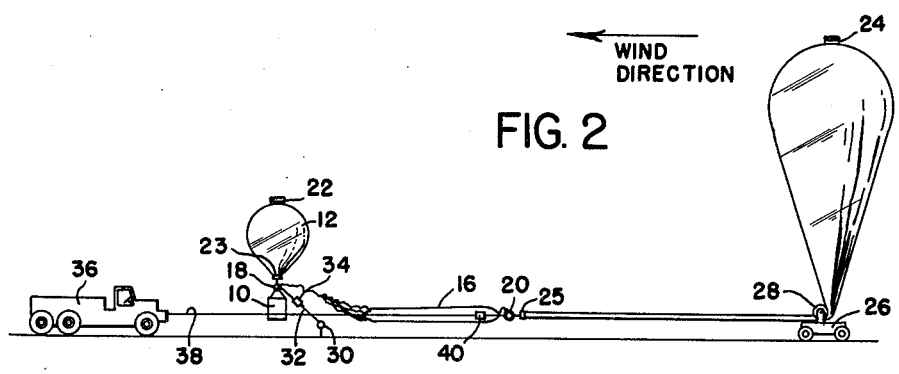
FIGURE 2 is a side elevational view depicting the balloons after they have been inflated with lifting gas.

A movable launch platform 26 is provided for restraining the main balloon during the inflation and prelaunch stage. Launch platforms of this nature are also well known in the art and will not be described in detail. The platform 26 is provided with a roller 28 hingedly connected to the platform, which restrains the balloon while both ends of the roller are connected to the platform 26, and which restrains a portion of the balloon in a horizontal position. The platform 26 is positioned so that the balloon 14 passes underneath the roller 28, and the apex and the appendix of the balloon are on opposite sides of the platform 26. As noted in FIGURE 1, the platform is positioned a sufficient distance away from the apex to permit the apex end of the balloon 14 to be inflated with lifting gas. As the balloon is inflated, it assumes a vertical position above the platform 26 as depicted in FIGURE 2. The platform 26 or the truck 36 and anchor line 38 may be moved relative to each other in order to adjust the height of the balloon 14 above the platform 26.

Figure 3:
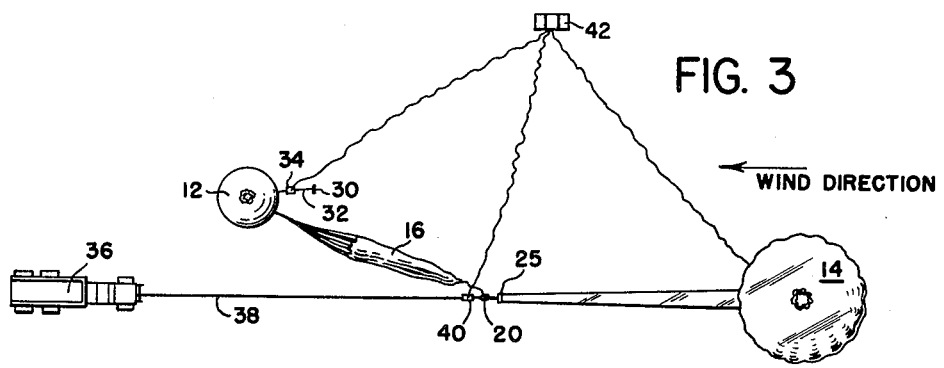
FIGURE 3 is a top plan view of the balloon arrangement illustrated in FIGURE 2.

In FIGURES 2 and 3, the balloons 12 and 14 are illustrated inflated with a lifting gas. The balloon 12 is shown substantially fully inflated, whereas balloon 14 is shown only partially inflated. As described above, with reference to balloon 14, each of the balloons is anchored in order to prevent them from ascending prematurely after being inflated. The balloon 12 is vertically positioned directly above the payload 10, and is anchored to a first anchor point 30 by means of a flexible cable 32. A line cutter designated generally by numeral 34 is provided for severing the cable 32. The apex of balloon 14 is restrained in the launch platform 26 as described above, and the appendix of this balloon is anchored to an anchor point or anchor vehicle 36 by means of an anchor line or cable 38. A line cutter 40 is provided for severing the cable 38 when the payload is to be launched. Line cutters of this type are well known in the art and will not be described in detail.

As noted in FIGURES 1 and 3, the balloons 12 and 14 are remotely positioned relative to each other; and as noted in FIGURE 1, they are disposed substantially on opposite sides of the payload 10 when they are in a deflated condition prior to launching. The relative positioning of the balloons and payload as illustrated, prevents them from becoming entangled with each other, with the truck 36, and the various cables.

As further noted in the drawings, the balloons are positioned relative to the payload so that the main balloon 14 is preferably positioned upwind with respect to the payload 10, i.e. the wind is blowing in a direction from the main balloon 14 toward the payload 10. It is however, conceivable that the balloon 14 might be positioned downwind with respect to the payload 10 as well, i.e. the wind would blow in a direction from the payload 10 toward the balloon 14. Factors which might influence this decision might be the payload weight, the balloon weight and size, the ratio of balloon to payload weight, wind speed, and tolerable system shock loading.

The release of the balloons from their respective anchor points is accomplished by remote control, thus alleviating the dangers to personnel who might be required to be within the immediate environment of the balloon and the payload if the balloons are manually released. It is pointed out however, that the balloons might be manually released, or if desired only the hinged roller 28 might be manually released. Preferably, the operator is positioned at a remote station designated by numeral 42, and the line cutters 34 and 40, and the mechanism holding the roller 28, are electrically connected to a control panel at 42. When the launch is to be initiated, a preferred sequence is to release one end of the hinged roller 28 from the platform 46; a few seconds later, the line cutters 34 and 40 are actuated, thereby severing the cables 32 and 38 respectively and permitting the balloons 12 and 14 to ascend. If desired, a different release sequence might be followed, the launch balloon 12 might be released first and the main balloon anchor line 38 released thereafter, or vice versa; or if desired, launch balloon 12 and anchor line 38 might be simultaneously released, depending upon the wind conditions, system weight, and the like. Another alternative, would be to release launch balloon 12 prior to release of the roller 28 from the platform 26 which allows the main balloon 14 to begin its ascent.

FIGURE 4 illustrates the payload and the balloons after the balloons have been inflated with lifting gas and subsequently released from their respective anchor points. Note that the launch balloon 12 has been inflated with sufficient lifting gas to enable it to lift the payload off the launch surface and into the air. Due to the larger amount of lifting gas in the main balloon 14, it rises faster than the launch balloon 12, and eventually reaches a near vertical position above the launch balloon 12 and payload 10. As illustrated in FIGURE 4, the balloon 14 is rising faster than the balloon 12, and since the wind is blowing from the main balloon 14 toward the launch balloon 12 and payload 10, the balloon 14 moves toward the balloon 12 and eventually overtakes it.

FIGURE 5 illustrates the launch after the balloon 14 has overtaken the balloon 12 and become positioned above it and the payload 10. The parachute 16 separates the two balloons from each other, as well as the payload from the balloon 14. It is pointed out that if desired, a flexible cable might be used in lieu of the parachute 16.

As shown in FIGURE 6, a destruction mechanism has been actuated thereby severing the end fitting 22 and permitting the launch balloon to be deflated. Although the balloon is shown as being deflated by removal of the end fitting 22, other known methods of deflating the balloon might be used as well, such as a valve, or by a rip panel in the balloon wall itself. Another alternative would be to provide no means for deflating the balloon, the balloon would then eventually burst as the ascent continues and the gas expands. In FIGURE 7, the deflated balloon 12 is shown separated from the payload 10. It is pointed out however, that it might be desirable to merely deflate the balloon 12 and not separate it from the payload 10; or in some instances it might be desirable to merely release the balloon 12 from the payload 10 without first deflating it. The particular procedure used might vary dependent upon various factors, such as the weight of the payload or the type of balloon 12 used.

Figure 8:
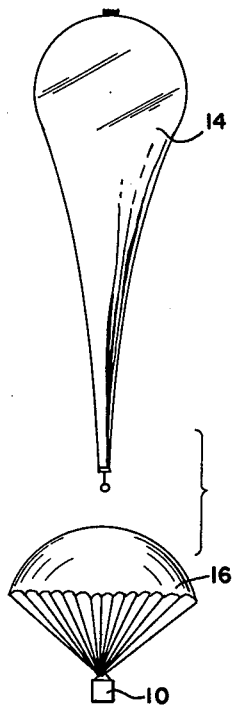
FIGURE 8 illustrates the payload and the second balloon after the payload has been separated from the second balloon and is being returned to the ground by a parachute.

In FIGURE 8, the parachute 16 is shown as being separated from the balloon 14, at the termination of the flight, and it is shown in a deployed condition. The payload 10 is returned to the ground by means of the parachute 16, and the balloon 14 is destroyed or deflated by conventional means.

Figure 9:
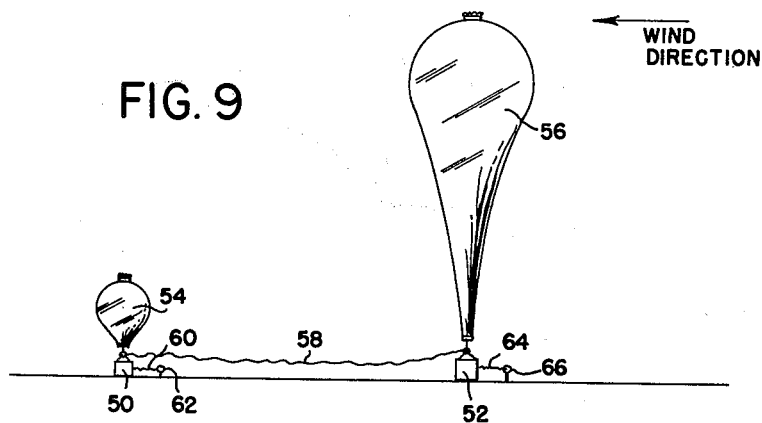
FIGURE 9 illustrates a different embodiment whereby the payload is comprised of a first portion which is attached directly to a first balloon, and a second portion which is attached directly to a second balloon.

FIGURE 9 illustrates a modification of the invention. In this embodiment, the payload is comprised of a first portion 50 and a second portion 52. The first portion 50 is attached to a launch balloon 54 and the second portion 52 is attached to a main balloon 56, which is somewhat larger than the launch balloon 54. The first portion 50 is also attached to the main balloon by means of a flexible cable 58, although a parachute might also be used if desired. The balloon 54 is shown in an inflated condition, and is anchored to the ground by means of a cable 60 which connects the payload 50 to the anchor point 62. The balloon 56 is also shown in an inflated condition, and is anchored to the ground by means of the cable 64 which connects the payload 52 to the anchor point 66. When the payload is to be launched, the cables 60 and 64 are severed, either in sequence or simultaneously, thereby releasing the balloons for ascent into the atmosphere. The balloons ascend in substantially the same manner as described above in connection with FIGURES 1–8. By splitting the payload in this manner, it is possible to have helium lift equal to less than the total payload weight in the launch balloon. It is also possible that more than one launch balloon might be used to lift each individual portion of a split payload.

In the above description and the attached drawings, a disclosure of the principles of this invention is presented, together with some of the embodiments by which the invention may be carried out.

Now therefore, I claim:

1. The method of launching a payload into the atmosphere by the use of two balloons which comprises attaching the payload to a first deflated balloon which is secured to a first anchor point, attaching the payload to a second deflated balloon which is substantially larger than the first balloon and which is secured to a second anchor point which is remotely positioned relative to the first anchor point, inflating said first balloon with sufficient lifting gas to lift the payload into the atmosphere when said balloon is released, inflating said second balloon with a larger amount of lifting gas than the first balloon, and releasing both balloons from their respective anchor points so that each is free to ascend into the atmosphere.

2. The method of launching a payload into the atmosphere by the use of two balloons which comprises attaching the payload to a first deflated balloon which is secured to a first anchor point, attaching the payload by means of a flexible cable to a second deflated balloon which is substantially larger than the first balloon and which is secured to a second anchor point which is remotely positioned relative to the first anchor point, inflating said first balloon with sufficient lifting gas to lift the payload into the atmosphere when said balloon is released, inflating said second balloon with a larger amount of lifting gas than the first ballon, releasing the first balloon from the first anchor point, and releasing the second balloon from the second anchor point, said second balloon rising faster than the first balloon so that the cable becomes taut and said second balloon thereafter lifts the payload into the atmosphere.

3. The method of launching a payload into the atmosphere by the use of two balloons which comprises attaching the payload to a first deflated balloon which is secured to a first anchor point, attaching the payload by means of a flexible cable to a second deflated balloon which is substantially larger than the first balloon and which is secured to a second anchor point which is remotely positioned relative to the first anchor point, inflating said first balloon with sufficient lifting gas to lift the payload into the atmosphere when said balloon is released, inflating said second balloon with a larger amount of lifting gas than the first balloon, releasing the second balloon from the second anchor point, and releasing the first balloon from the first anchor point, said second balloon rising faster than the first balloon so that the cable becomes taut and said second balloon thereafter lifts the payload into the atmosphere.

4. The method of launching a payload into the atmosphere by the use of two balloons which comprises attaching the payload to a first deflated balloon which is secured to a first anchor point, attaching the payload by means of a flexible cable to a second deflated balloon which is substantially larger than the first balloon and which is secured to a second anchor point, inflating said first balloon with sufficient lifting gas to lift the payload into the atmosphere when said balloon is released, inflating said second balloon with a larger amount of lifting gas than the first balloon, releasing both balloons from their respective anchor points, said second balloon rising faster than the first balloon so that the cable becomes taut and said second balloon thereafter lifts the payload into the atmosphere, and deflating the first balloon at a predetermined altitude so that the entire payload is carried by the second balloon.

5. The method of launching a payload into the atmosphere by the use of two balloons which comprises attaching the payload to a first deflated balloon which is secured to a first anchor point, attaching the payload by means of a flexible cable to a second deflated balloon which is substantially larger than the first balloon and which is secured to a second anchor point, inflating said first balloon with sufficient lifting gas to lift the payload into the atmosphere when said balloon is released, inflating siad second balloon with a larger amount of lifting gas than the first balloon, releasing both balloons from their respective anchor points, said second balloon rising faster than the first balloon so that the cable becomes taut and said second balloon thereafter lifts the payload, and releasing the first balloon from the payload at a predetermined altitude so that the payload is carried by the second balloon into the atmosphere.

6. The method of launching a payload into the atmosphere by the use of two balloons which comprises attaching the payload to a first deflated balloon which is secured to a first anchor point, attaching the payload by means of a flexible cable to a second deflated balloon which is substantially larger than the first balloon and which is secured to a second anchor point, inflating said first balloon with sufficient lifting gas to lift the payload into the atmosphere when said balloon is released, inflating said second balloon with a larger amount of lifting gas than the first balloon, releasing both balloons from their respective anchor points, said second balloon rising faster than the first balloon so that the cable becomes taut and said second balloon thereafter lifts the payload, deflating the first balloon, and releasing said first balloon from the payload so that the payload is carried into the atmosphere by the second balloon.

7. The method of launching a payload into the atmosphere by the use of two balloons which comprises attaching the payload to a first deflated balloon which is secured to a first anchor point, attaching a parachute to the payload, attaching a second deflated balloon which is substantially larger than the first balloon to the apex of the parachute, securing said second balloon to a second anchor point which is remotely positioned relative to the first anchor point, inflating said first balloon with sufficient lifting gas to lift the payload into the atmosphere when said balloon is released, inflating said second balloon with a larger amount of lifting gas than the first balloon, releasing both balloons from their respective anchor points, said second balloon rising faster than the first balloon so that the parachute becomes taut and said second balloon thereafter lifts the payload into the atmosphere.

8. The method of launching a payload comprised of at least two separate portions into the atmosphere by the use of two balloons which comprises attaching a first portion of said payload to a first deflated balloon which is secured to a first anchor point, attaching said first portion of the payload by means of a flexible cable to a second deflated balloon which is substantially larger than the first balloon and which is secured to a second anchor point, attaching a second portion of said payload to the second balloon, inflating said first balloon with sufficient lifting gas to lift the first portion of the payload into the atmosphere when said balloon is released, inflating said second balloon with a larger amount of lifting gas than the first balloon, releasing both balloons from their respective anchor points, said second balloon rising faster than the first balloon so that the cable becomes taut and said second balloon thereafter lifts both portions of the payload into the atmosphere.

9. The method of launching a payload into the atmosphere by the use of two balloons which comprises disposing a first balloon in a deflated and extended condition adjacent to the payload so that its apex is positioned farther away from said payload than its appendix, disposing a second balloon in a deflated and extended condition in relative proximity to the payload so that its apex is positioned substantially on the opposite side of the payload from the apex of the first balloon, said second balloon being substantially larger than the first balloon, attaching the payload to the first balloon, attaching the payload by means of a parachute to the second balloon, securing the first balloon to a first fixed anchor point so that it is not free to ascend into the atmosphere, securing the appendix of the second balloon to a second fixed anchor point by means of an anchor line, said second point being remotely positioned relative to the first anchor point, restraining a portion of said second balloon in a horizontal position by means of a movable platform, inflating the first balloon with sufficient lifting gas to lift the payload into the atmosphere, inflating the apex end of the second balloon with a larger amount of lifting gas than the first balloon so that a portion of said second balloon assumes a vertical position above said platform, releasing said second balloon from the restraining platform, and releasing both balloons from their respective fixed anchor points, said second balloon rising faster than the first balloon so that the parachute becomes taut and said second balloon thereafter lifts the payload to the predetermined altitude.

10. A balloon train for launching a payload comprising a first inflated balloon designed to lift the payload from a supporting surface, first individual means for attaching the payload to said first balloon so that the payload is lifted off said supporting surface, a second balloon which is larger than said first balloon and which is inflated with a larger amount of lifting gas than said first balloon to provide a rate of rise which is faster than that of said first balloon, and second individual means for attaching the payload to said second balloon so that upon ascent of said balloons said second balloon will overtake said first balloon and carry the payload to a predetermined altitude.

11. A balloon train for launching a payload from a supporting surface comprising a first launch balloon; means for attaching the payload to said launch balloon; means for inflating said launch balloon with lifting gas to cause said launch balloon to rise and lift the payload off said surface; a second main balloon which is larger than said launch balloon; said main balloon being attached to the payload; and means for inflating said main balloon with a larger amount of lifting gas than said launch balloon, said main balloon having a faster rate of rise than that of said launch balloon so that said main balloon overtakes said launch balloon and carries the payload to a predetermined altitude.

12. A balloon train for launching a payload from a supporting surface for flight to a selected altitude, which comprises a first launch balloon; means for attaching said payload to said launch balloon; means for inflating said launch balloon to lift said payload from said surface; first means for releasably maintaining said launch balloon anchored to said surface with said payload spaced from said surface; a main balloon connected to said payload, said main balloon having a greater free lift than that of said launch balloon; means for inflating said main balloon; second means for releasably maintaining said main balloon anchored to said surface at a point remotely located from said launch balloon, and means for releasing said first and second means to permit free flight of said launch and main balloons, said greater free lift of said main balloon causing said main balloon to overtake said launch balloon and to lift said payload to said selected altitude.

13. A balloon train according to claim 12 including means rendered effective upon said overtaking for deflating said launch balloon so that said payload is supported solely by said main balloon.

14. A balloon train according to claim 13 including a releasable connection between said launch balloon and said payload, and means rendered effective upon said deflation of said launch balloon for releasing said releasable connection to sever said launch balloon from said payload.

15. The combination of claim 12 wherein the payload is releasably attached to the launch balloon and means is provided for releasing said launch balloon from the payload upon said overtaking of said launch balloon.

16. A balloon train for launching a payload comprising a first deflated balloon, means for releasably securing said balloon to a first anchor point, means for attaching the payload to said first balloon, a second deflated balloon which is larger than said first balloon and adapted to be inflated with a larger amount of lifting gas than said first balloon, means for releasably securing said second balloon to a second anchor point which is remotely positioned relative to the first anchor point, said anchor points being positioned substantially on opposite sides of the payload, a parachute attached to the second balloon, a cable for attaching the payload to said parachute, means for inflating said first and second balloons with lifting gas, and means for releasing both balloons from their respective anchor points.

17. A balloon train for launching a payload formed by at least two separate portions comprising a first balloon, first individual means for attaching a first separate portion of said payload to said first balloon, a second balloon which is larger than said first balloon, a cable for attaching said first portion to the second balloon, second individual means for attaching a second separate portion of said payload to the second balloon, means for inflating said first balloon with lifting gas so that said first balloon carries said first separate portion of the payload into the atmosphere, means for inflating said second balloon with a larger amount of lifting gas than said first balloon, so that the second balloon rises faster than the first balloon until said cable becomes taut whereupon the entire payload is carried to a predetermined altitude by said second balloon.

18. The method of launching a payload from a surface to a predetermined altitude in the atmosphere, which comprises: connecting said payload to a first balloon capable of lifting said payload and having a given free lift, connecting said payload to a second balloon capable of lifting said payload and having a free lift exceeding said given free lift, restraining said first balloon from free flight with said payload lifted off said surface by said first balloon, restraining said second balloon from free flight, and releasing said restraints of first and second balloons, during said free flight said second balloon rising at a greater rate than that of said first balloon so that said second balloon overtakes said first balloon and lifts said payload to said predetermined altitude.

19. The method of launching a high altitude balloon for free flight to a selected altitude in the atmosphere, which comprises: connecting a launch balloon to a payload, said launch balloon being designed to lift said payload from a supporting surface, inflating said launch balloon to lift said payload from said surface, restraining said launch balloon from free flight with said payload lifted above said surface by said launch balloon, connecting said high altitude balloon to said payload, inflating said high altitude balloon, restraining said high altitude balloon from free flight, and releasing said launch and high altitude balloons for free flight to permit said high altitude balloon to overtake the ascent of said launch balloon and lift said payload to said selected altitude.

20. In a system for launching a first balloon to lift a payload from a supporting surface to a selected altitude in the atmosphere, wherein said payload is connected to said first balloon and said first balloon has a given free lift, the combination with said first balloon and said payload of a second launch balloon having a free lift less than said given free lift and designed to lift said payload from said supporting surface, means for connecting said second launch balloon to said payload to permit said second launch balloon to maintain said payload lifted off said surface during launching of said first balloon, and means rendered effective upon launching of said first balloon and lifting of said payload by said first balloon for disconnecting said launch balloon from said payload to permit free flight of said first balloon to said selected altitude.

References Cited by the Examiner

UNITED STATES PATENTS 2,165,610  7/39  Boyle _____ 244—98 X

FOREIGN PATENTS 151,488  10/61  Russia.

MILTON BUCHLER, *Primary Examiner.*

ANDREW H. FARRELL, *Examiner.*